US006876982B1

(12) United States Patent
Lancaster

(10) Patent No.: US 6,876,982 B1
(45) Date of Patent: Apr. 5, 2005

(54) UNIVERSAL CONTRACT EXCHANGE

(75) Inventor: Roger Lancaster, Paddington (AU)

(73) Assignee: Lancaster Australia Pty Limited, Paddington ( * ) Notice: Subject to any disclaimer, the term of this patent is extended or adjusted under 35 U.S.C. 154(b) by 0 days.

(21) Appl. No.: 09/125,479

(22) PCT Filed: Feb. 18, 1997

(86) PCT No.: PCT/AU97/00087

§ 371 (c)(1),
(2), (4) Date: May 6, 1999

(87) PCT Pub. No.: WO97/30407

PCT Pub. Date: Aug. 21, 1997

(30) Foreign Application Priority Data

Feb. 19, 1996 (AU) .............................................. PN8157

(51) Int. Cl.[7] .......................... G06F 17/60; G06F 15/30
(52) U.S. Cl. .............................. 705/37; 705/35; 705/36
(58) Field of Search ............................... 705/35, 36, 37

(56) References Cited

U.S. PATENT DOCUMENTS

| | | | | |
|---|---|---|---|---|
| 4,597,046 A | * | 6/1986 | Musmanno et al. | 364/408 |
| 4,752,877 A | * | 6/1988 | Roberts et al. | 364/408 |
| 4,903,201 A | * | 2/1990 | Wagner | 364/408 |
| 5,063,507 A | * | 11/1991 | Lindsey et al. | 364/408 |
| 5,262,942 A | * | 11/1993 | Earle | 364/408 |
| 5,297,031 A | * | 3/1994 | Gutterman et al. | 364/408 |
| 5,724,524 A | * | 3/1998 | Hunt et al. | 395/237 |
| 5,970,479 A | * | 10/1999 | Shepherd | 705/37 |

FOREIGN PATENT DOCUMENTS

| | | |
|---|---|---|
| EP | 91306146.1 | 5/1991 |
| GB | 9516896.9 | 12/1995 |
| WO | PCT/US93/00916 | 2/1993 |
| WO | PCT/US95/00827 | 7/1995 |

OTHER PUBLICATIONS

Is the discount window necessary? A Penn Central perspective; Calomiris, Charles W; Federal Reserve Bank of St. Louis Review v76n3 pp:31–55 May/Jun. 1994.*

Futures trading: who dares wins (sometimes), Evening Post; Wellington, New Zealand; Apr. 30, 1996; Coote, Michael.*

Appendix to the testimony of Kalo A. Hineman acting commodity futures trading commission before the committee on banking, housing, and urban affairs united states senate, American Banker; New York, N.Y.; Feb. 19, 1988.*

Baiscs of stock index futures trading Note: Part 3.Graphics (statistics)–Bearish Strategy.;STF); Business Times; Kuata Lumpur; Apr. 29, 1996.*

Money Market futures; Economic Review; Richmond; Nov./Dec. 1992; Kuprianov, Anatoli.*

The Austrian derivatives market; Global Investor; London; 1994; Schiendl, Gunther.*

Guide to European Equity Markets 1992: Austria; Schiendl, Gunther, Euromoney European Equity Markets Supplement.*

(Continued)

*Primary Examiner*—Yehdega Retta
(74) *Attorney, Agent, or Firm*—Howison & Arnott, L.L.P.

(57) ABSTRACT

This invention concerns trading in financial instruments, such as by use of a computer based cash management facility electronically linked to a computer based clearing house, and an automated real time screen trading system operated by the investor using standard personal computers linked by a communications network to a central clearing house computer. In particular, this invention concerns a contract exchange and protocol, and in another aspect it concerns a financial instrument. The contract exchange may provide direct entry to the market, and the opportunity to trade 24 hours a day, to potential investors from every office and home in the world. Trading need never cease on the Contract Exchange even with an external world catastrophe.

3 Claims, 3 Drawing Sheets

OTHER PUBLICATIONS

Money Market futures; Economic Review; Richmond; Nov./Dec. 1992, Kuprianov, Anatoli.*

Electronic grading, market structure and liquidity; Financial Analysts Journal; Charlotteville; Jan.–Feb. 1994; Massimb, Marcel N; Phelps, Bruce D.*

York Securities New Account Applicantion, Margin Agreement.*

Strong Invesments; Customer Agreement.*

Basic facts about futures trading, "Understanding Opportunities and Risks in Futures Trading"; http:www.e-futures.com/understanding .htm.*

PCT International Search Report for International Appl. No. PCT/AU97/00087.

* cited by examiner

UNIVERSAL CONTRACT EXCHANGE

TECHNICAL FIELD

This invention concerns trading in financial instruments, such as by use of a computer based cash management trust electronically linked to a computer based clearing house, and automated real time screen trading system operated by the investor using standard personal computers linked by a communications network to central clearing house computer.

In particular, this invention concerns a contract exchange and protocol, and in another aspect it concerns a financial instrument.

BACKGROUND ART

Currently only a select few financial institutions have direct access to the world's major trading markets. The vast majority of companies and individuals have to deal through brokers who execute all trading orders. Most investors are not given direct access to on market exchanges because of their potential lack of credit worthiness with its direct potential adverse effect on other investors or because of its potential disastrous effect on the solvency or credit rating of the clearing house. Other creditworthy investors are denied entry to on market exchanges and some over the counter markets by restrictive trade practices designed for the benefit of existing members.

Many companies, banks, government treasuries, central banks, government authorities, institutions, professional fund managers and individuals worldwide would like direct entry to major world markets and would like to be able to have direct control of order execution from their office or home and also be able to limit their potential losses. Existing major trading markets and financial instruments do not fulfil this need.

DISCLOSURE OF THE INVENTION

The invention, as currently envisaged, provides in a first aspect a contract exchange comprising:
  a central clearing house computer;
  a cash depositing facility, such as computer based cash management fund, electronically linked to the central clearing house computer; and
  an automated real time screen trading system operated by investors using personal computers linked by telephone lines to the central clearing house computer.

The contract exchange creates, trades and closes indivisible financial package contracts each of which have two parties, a buyer and a seller, who are the beneficial owners of the proceeds of a binding obligation requiring a cash settlement based on a settlement price of a specific quantity of a specified type of product at an agreed price, place and time.

The price of the contracts is determined by a market.

The contracts are geared and investors must make sufficient funds available to a trading account from a depositing facility account to cover the proportion of the value of a contract, as determined by the gearing ratio, before an investor is permitted to buy or sell. As the price moves in the market, the parties to contracts gain or lose the entire changed value of the contracts they hold. Either the buyer or the seller makes an incremental profit after each price movement and the counter party makes an incremental loss. The credit is immediately transferred from the trading account of the party making the loss to the party making the profit.

The clearing house holds options on all the contracts and is able to exercise its option rights to dispose of some or all of a party's contracts in the market if that party's trading, or assigned funds became insufficient to cover the proportion of the value of the contracts held, as determined by the gearing ratio. Should the clearing house be unable to dispose of the contracts required in the market then when the contract price moves such that the party's funds fall to zero, it is able to close all that party's contracts at that price, simultaneously closing all the contracts held by the counter parties. Closing takes place without delay and without the involvement of any other parties.

When the clearing house is exercising its option rights and attempting to dispose of a party's contracts in the market and a counter party enters the opposite parameter of the market, then the clearing house may close all the party and counter party contracts that are in the market at the same time.

If a party has sufficient funds to cover the proportion of the value of the contracts held, as determined by the gearing ratio, at the last sale price but not at the price of one of the market parameters, and a counter party enters the market at that parameter to close a position, the clearing house may close sufficient of the party's contracts with the counter party's contracts so that the party no longer has insufficient funds to cover the proportion of the value of the contracts held at the price of that market parameter.

In order to create a new indivisible financial package contract the clearing house must enter into a purchase contract with the buyer of the contract, and enter into a sale contract with the seller of that contract at the same price.

The contract exchange may provide direct entry to the market, and the opportunity to trade 24 hours a day, to potential investors from every office and home in the world. Trading need never cease on the Contract Exchange even with an external world catastrophe.

The investor must have cleared funds in a deposit facility (cash management trust) account electronically linked with the clearing house before he can commence trading. An investor need not be evaluated for credit worthiness by the clearing house or other investors as it is irrelevant to the system. The potential losses of investors are restricted to a pre-determined maximum level; that is the amount assigned to trading.

The Contract Exchange has less theoretical chance of defaulting, invoicing back contracts, repricing contracts, or avoiding contracts than the world's existing major stock exchanges, option exchanges, futures exchanges or other exchanges.

An investor may reinvest unrealised surplus assigned funds (perhaps derived from unrealised profits) from his trading account into further contracts, or transfer unrealised surplus assigned funds via his cash management trust account back to himself. Reinvestment may be conducted automatically by the clearing house if desired.

An investor may have part of or all of his position closed out by the exercise of the clearing house held option if he does not maintain the minimum required assigned funds for the position. If the clearing house exercises its option with both the party and counter party without the counter party giving a trading order the counter party will never be limited by this exercise of the clearing house held option to less than a 100% gain on the minimum required assigned funds for his position from a particular point of time.

The number of head products covered by the contracts could eventually be greater than any other individual financial market as the number of potential users of the market is broader because of its open access policy and attributes mentioned above. Thus, small individual segments of any world market could be covered.

The contracts also provide a hedging tool to diversify risk with unique hedging advantages.

In another aspect the invention provides a protocol for trading on a contract exchange, comprising the steps of:

providing a central clearing house computer;

providing a cash depositing facility such as computer based cash management fund electronically linked to the central clearing house computer;

providing an automated real time screen trading system operated by investors using personal computers linked by telephone lines to the central clearing house computer;

creating, trading and closing indivisible financial package contracts each of which have two parties, a buyer and a seller, who are the beneficial owners of the proceeds of a binding obligation requiring a cash settlement based on a settlement price of a specific quantity of a specified type of product at an agreed price, place and time;

determining the price of the contracts by operation of a market;

leveraging the contracts and monitoring the funds each investor has available to ensure each investor has sufficient funds available in a trading account to cover the proportion of the value of a contract, as determined by the leveraging ratio, before an investor is permitted to buy or sell;

exercising option rights to dispose of some or all of a party's contracts in the market if that party's funds become insufficient to cover the proportion of the value of the contracts held, as determined by the leveraging ratio;

if unable to dispose of the contracts required in the market then, when the contract price moves such that the party's funds fall to zero, closing all that party's contracts at that price, and simultaneously closing all the contracts held by the counter parties. Closing takes place without delay and without the involvement of any other parties.

When exercising option rights and attempting to dispose of a party's contracts in the market and a counter party enters the opposite parameter of the market, closing all the party and counter party contacts that are in the market at the same time.

If a party has sufficient funds to cover the proportion of the value of the contracts held, as determined by the leveraging ratio, at the last sale price but not at the price of one of the market parameters, and a counter party enters the market at that parameter to close a position, option rights will be exercised to close sufficient of the party's contracts with the counter party's contracts so that the party no longer has insufficient funds to cover the proportion of the value of the contracts held at the price of that market parameter.

As the price moves in the market, requiring the parties to contracts to gain or lose the entire change in value of the contracts they hold so that either the buyer or the seller makes an incremental profit after each price movement and the counter party makes an incremental loss, and immediately transferring the credit from the trading account of the party making the loss to the party making the profit.

In a further aspect the invention provides a unique indivisible financial package contract which is a binding obligation requiring a mandatory cash settlement based on a settlement price of a specific quantity of a specified type of product at an agreed price, place and time. Each contract has two parties, a buyer and a seller, who are the beneficial owners of the proceeds of the binding obligation.

When holding contracts, the price moves as determined by market forces.

The contracts are leveraged and investors must make sufficient funds available to a trading account from the depositing facility account to cover the proportion of the value of a contract, as determined by the leveraging ratio, before an investor is permitted to buy or sell. As the price moves in the market, the parties to contracts gain or lose the entire change of value of the contracts they hold. Either the buyer or the seller makes an incremental profit after each price movement and the counter party makes an incremental loss. The credit is immediately transferred from the trading account of the party making the loss to the party making the profit.

The clearing house holds options on all the contracts and is able to exercise its option rights to dispose of some or all of a party's contracts in the market if that party's funds became insufficient to cover the proportion of the value of the contracts held, as determined by the leveraging ratio. Should the clearing house be unable to dispose of the contracts required in the market then when the contract price moves such that the party's funds fall to zero, it is able to close all that party's contracts at that price, simultaneously closing all the contracts held by the counter parties. Closing takes place without delay and without the involvement of any other parties.

When the clearing house is exercising its option rights and attempting to dispose of a party's contracts in the market and a counter party enters the opposite parameter of the market, then the clearing house may close all the party and counter party contracts that are in the market at that time.

If a party has sufficient funds to cover the proportion of the value of the contracts held, as determined by the leveraging ratio, at the last sale price but not at the price of one of the market parameters, and a counter party enters the market at that parameter to close a position, the clearing house may close sufficient of the party's contracts with the counter party's contracts so that the party no longer has insufficient funds to cover the proportion of the value of the contracts held at the price of that market parameter.

In order to create a new indivisible financial package contract the clearing house must enter into a purchase contract with the buyer of the contract, and enter into a sale contract with the seller of that contract at the same price.

BRIEF DESCRIPTION OF THE DRAWINGS

An example of the invention will now be described with reference to the accompanying drawings, in which.

DESCRIPTION OF THE REFERENCE NUMERALS

Figure 1:
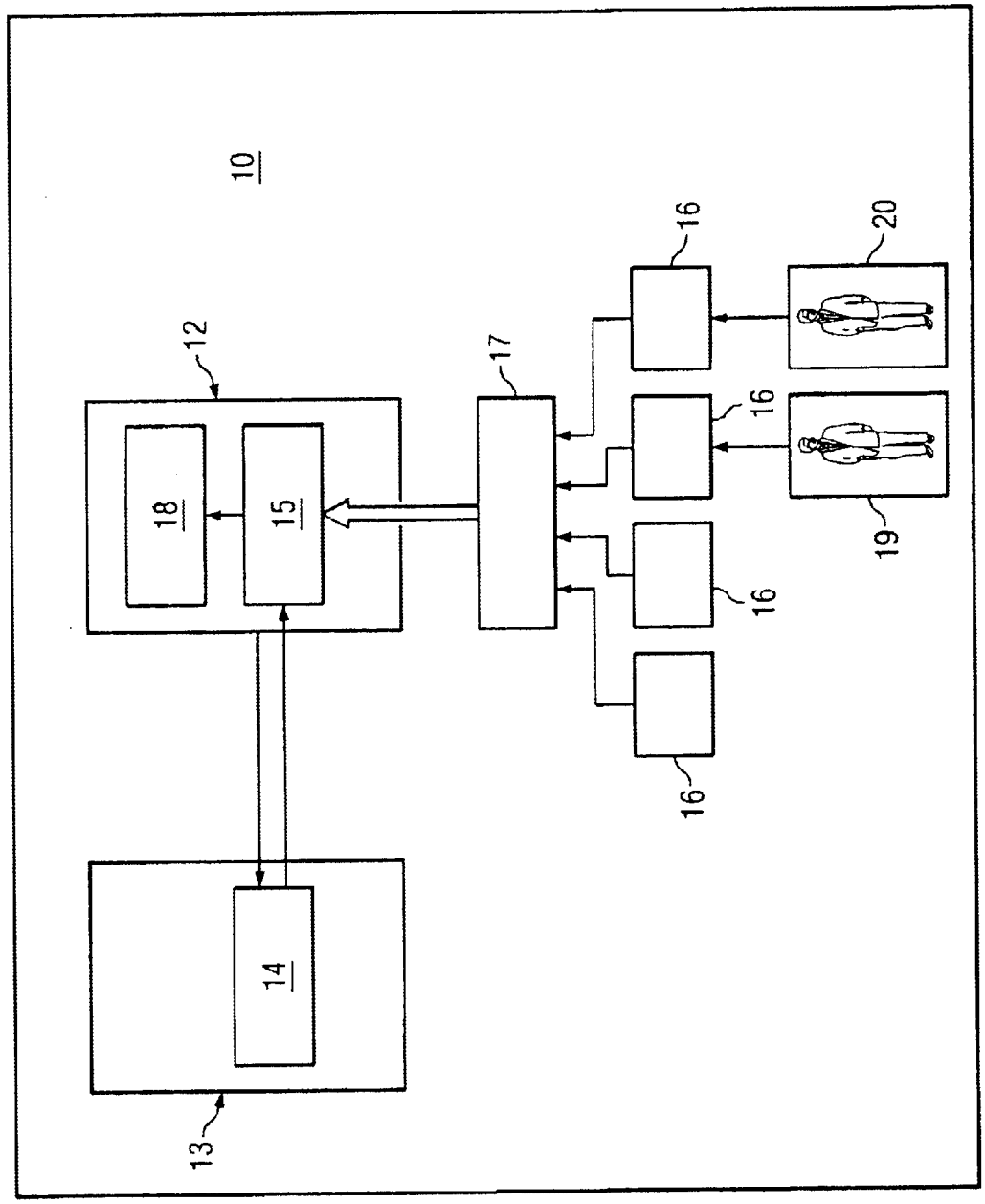
FIG. 1 illustrates a block diagram of a contract exchange according to one embodiment of the current invention.

10 contract exchange;
12 a central clearing house computer;
13 a cash depositing facility;

14 a computer base cash management find;
15 an automated real time screen trading system;
16 personal computers;
17 telephone lines;
18 indivisible financial package contracts; (see 107 in FIG. 2)
19 a buyer; and
20 a seller
100 Step of transferring cleared cash;
101 step of electronically sending order to exchange;
102 step of receiving cash at bank;
103 step of assigning funds electronically to clearing house surplus account;
104 step of requiring a clearing house margin;
105 step of checking order for available cash;
106 step of confirming order;
107 step of obtaining contracts;
108 step of confirming trades;
109 step of clearing house acting on open contracts (see FIG. 3);
110 step of investor inactive;
111 step of settling at termination date;
112 step of investor closing out position;
113 step of novating contracts;
114 step of closing contracts;
115 cash settlement;
200 step of clearing house acting on all open contracts (see 109 in FIG. 2);
201 step of assign funds being deficient at last sell price;
202 step of clearing house acting in the market
203 step of novating the contract
204 step of not succeeding in the market;
205 step of exempt closing crossing when assign fund 0;
206 step of counterparting and entering market at perimeter;
207 step of no assigned finds deficiency at perimeter;
208 step of no party position being closed out;
209 step of assigned funds deficiency of party at perimeter;
210 step of clearing house acting;
211 step of exempt market crossing;
212 step of surplus at last sale price above any initial surplus;
213 step of building up contract numbers trading method;
214 step of clearing house acting when surplus deficient;
215 step of contracts being opened;
216 step of contracts being novated;
218 step of surplus at last sale being below initial surplus but above required assigned funds;
219 step of surplus accumulating trading method;
220 step of cash settlement.

Best Mode of the Invention

Referring now to FIG. 1, there is illustrated a contract exchange 10 which comprises a central clearing house computer 12. A cash depositing facility 13 including a computer based cash management fund 14 is electronically linked to a central clearing house computer 12. An automated real time trading system 15 is operated by investors using personal computers 16 linked by telephone lines 17 to the central clearing house computer 12. Contract exchange 10 creates, trades, and closes indivisible financial package contract 18 each of which have two parties, a buyer 19 and a seller 20. The buyer and seller are the beneficial owners of the proceeds of a binding obligation required requiring a cash settlement based on a settlement price of a specific quantity of a specified type of product at an agreed price, place and time. There after the price of the contracts is determined by market forces.

Trading Format

General Trading Procedures

Figure 2:
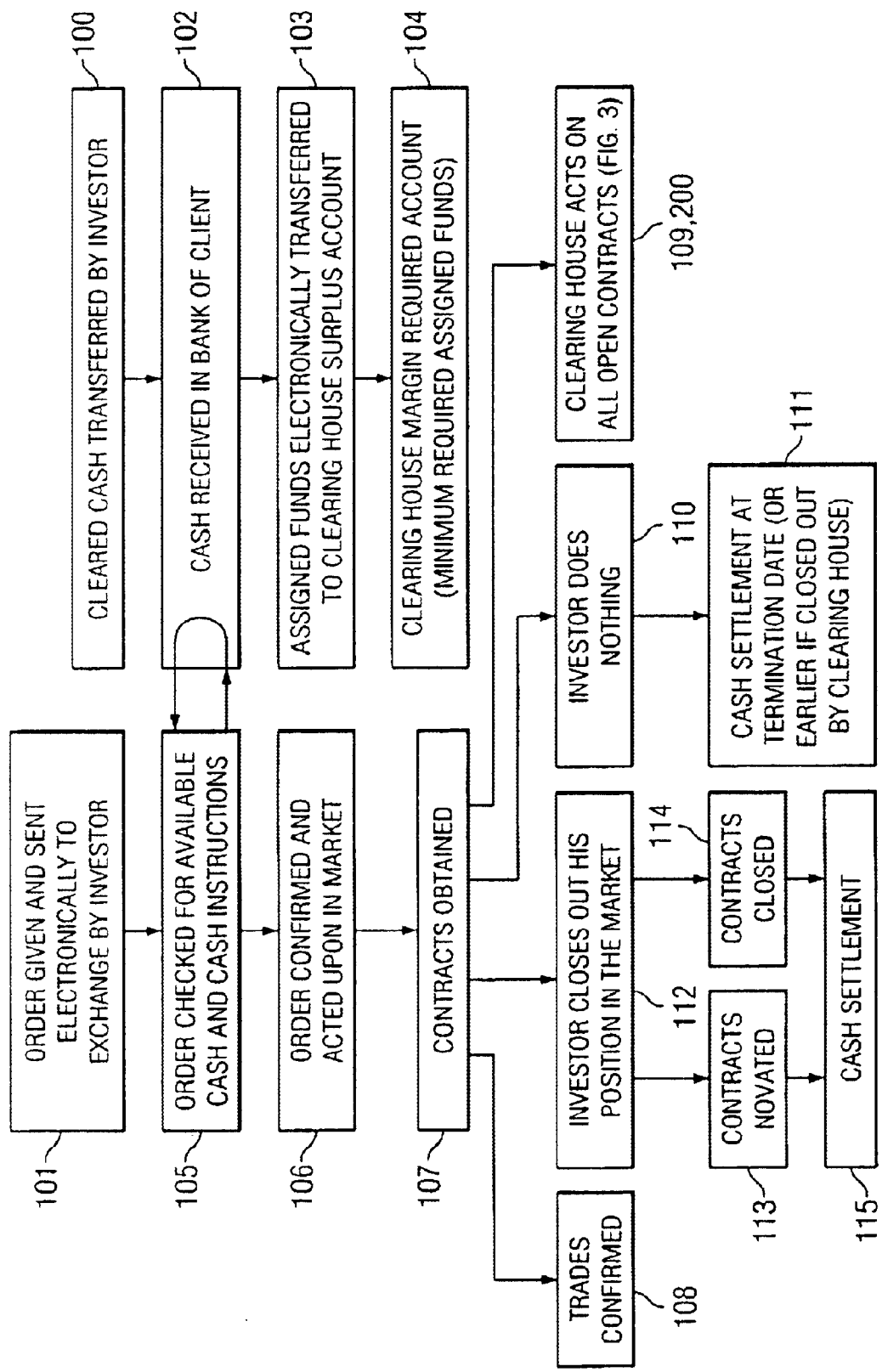
FIG. 2 illustrates a flow diagram showing the steps required to be taken to create trade and close contracts in this embodiment.

A Contract Exchange cash management trust 13 is electronically attached to the clearing house 12. Before an investor can trade he must have suitable software, hard ware and communications line and he must have completed an application form in relation to opening a cash management trust account 14 and entered into an agreement-contract (Trading Agreement and Risk Disclosure Statement) with the Contract Exchange 10 that binds the investor to the Contract Exchange Rules. Referring now to FIG. 2, there is illustrated the steps required create trade and close contracts. The completed application form and agreement-contract must be lodged with an agent bank. At the same time the investor must deposit funds with the agent bank and the funds must be cleared 100 prior to their transfer to his 102 cash management trust account 14. For security reasons an investor can only trade in the same name as the name of his cash management trust account. Similarly cheques will only be paid from his cash management trust account to a drawee or funds transferred, in the same name as the cash management trust account name. Investors will earn a commercial rate of interest on the funds in their cash management trust account and a commercial rate of interest on funds in their clearing house assigned funds account. All clearing house funds will be deposited in an account with the cash management trust.

Funds will be swept out 103 of the investor's cash management trust account to his assigned funds account with the clearing house when the investor gives his initial trading order 101. Further funds may also be swept out of the investor's cash management trust account at a later date at the investor's request. The investor has the right to designate or assign the level of funds he wishes to put at risk in trading. It may only be a small portion of his cash management trust account balance. Only funds available in the investor's cash management account can be assigned to trading, to form part of an investor's total assigned funds. The clearing house has no recourse to the investor for anything other than the funds in the investor's assigned funds accounts. The clearing house will automatically only accept 106 a trading order from an investor if he has the required funds necessary to be assigned to trading available in his cash management trust account or in his accounts with the clearing house if he has surplus assigned funds in those accounts 105. The clearing house will terminate an accepted trading order if at any time prior to the trading order being executed the investor has insufficient assigned funds 104 to cover the given trading order. The minimum required assigned funds to cover the position to be opened will be needed if no surplus funds are also assigned. If surplus funds are assigned to the position the clearing house will terminate an accepted trading order if those surplus assigned funds cease to be available.

Funds will automatically be swept from the investor's clearing house assigned funds account to (and remain deposited in) the investor's cash management trust account at the time a contract class position is closed out 115, 220 or on the termination date of the contract 111 unless the investor has given a contrary mandate or instruction to the clearing house.

Figure 3:
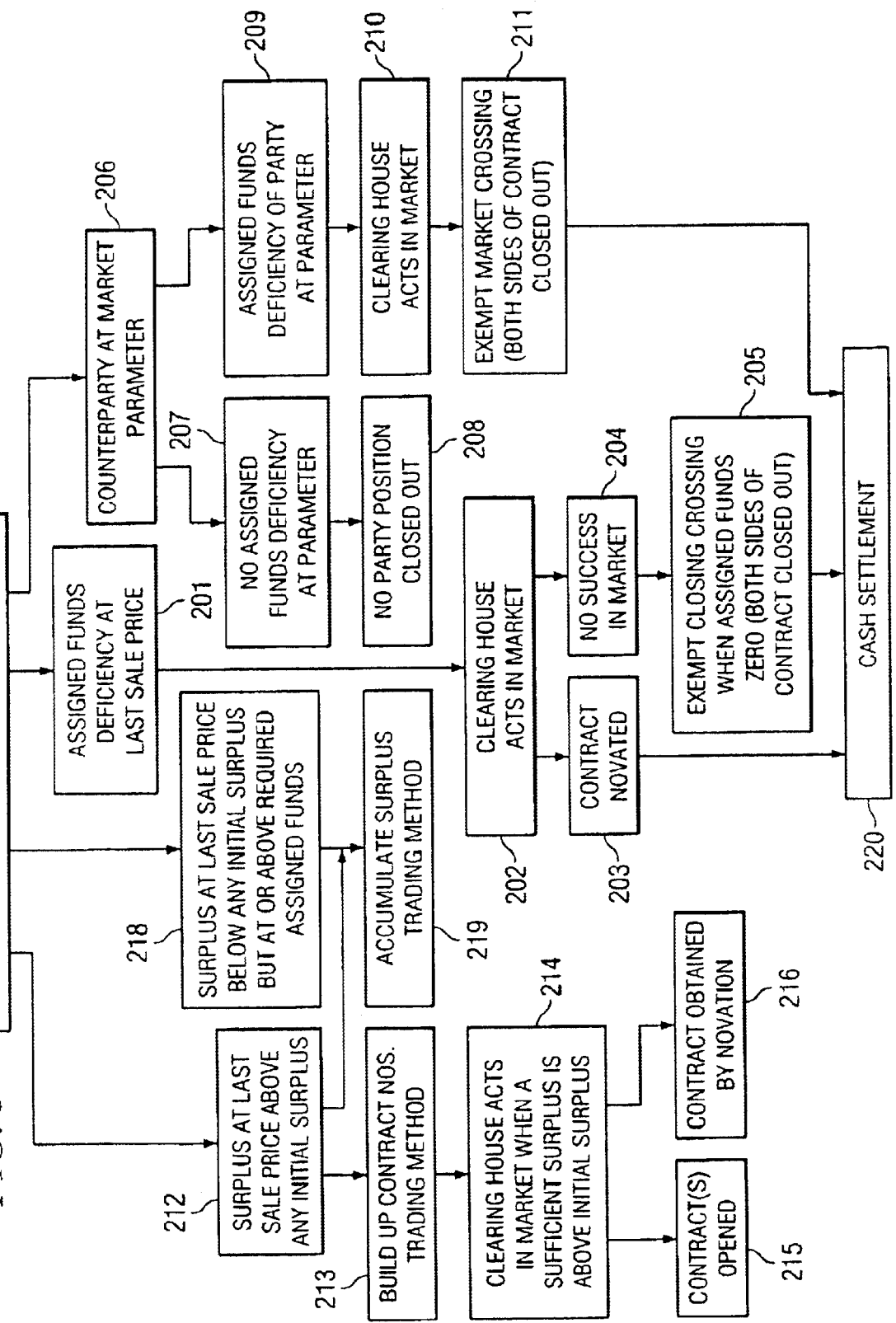
FIG. 3 illustrates a flow diagram showing the steps taken by the clearing house to act on open contracts in different circumstances.

A leveraging system applies with the contract. In the books of accounts of the Contract Exchange clearing house all investors' assigned funds accounts are debited and credited automatically with every price movement of their contracts during the day, every day. The contract clearing house automatically monitors all positions with every price fluctuation. This is a simple task as the clearing house can calculate positions prior to price movements if necessary and can collate similar positions together. The clearing house acts in an automated way as set down in the Contract Exchange Rules. The clearing house may act as an authorised agent 109, 200 without discretion for investors in market activities. Referring now to FIG. 3, there is illustrated the steps taken by the clearing house to act on open contracts in different circumstances. To assist in facilitating these activities a minimum bid (tick) market is always provided. If the market moves against an investor giving the investor insufficient assigned funds to cover his contracts to conform with the acceptable leveraging ratio 201, the clearing house automatically attempts to exercise its option and acts as agent on the investor's contracts 202 and places a trading order at the last traded price ie. at the market offer (ask) price if selling and at the market bid price if buying and attempts to novate 203 contract holders or 204 close out sufficient contracts so that the investor's assigned funds are sufficient for the reduced number of contracts that the Rules allow him to hold given the investors level of assigned funds after accounting for realised and unrealised losses and gains. Similarly the clearing house may be acting as agent and be automatically increasing 213 the number of contracts of other investors if those investors have selected the trading method that directs the clearing house to automatically reinvest specified unrealised surplus 212 assigned funds into further contracts to increase those investors' exposure.

Each contract type will have a set minimum bid (tick) suitable and realistic to that contract type. This will be partly determined by the recent trading history and depth of existing markets.

Trading orders 106 are collated and quantities are shown on the screen at each quoted buy and sell price near the market excluding bids higher than the market offer price and offers lower than the market bid price. Trading orders are queued according to price and time with the clearing house taking its position as agent in the queue as appropriate. However clearing house crossings such as an Exempt Market Crossing 211 or an Exempt Closing Crossing 205 that close out both a contract and a contra position contract are exempt from market participation and queuing, as is a clearing house crossing such as an Exempt Opening Crossing that opens both a contract and a contra position contract. No other crossings are exempt from market participation. In most situations at each price the clearing house will probably be in the queue to buy or sell contracts. However, at times the clearing house may have no trading orders to execute.

The clearing house does not necessarily have an active market function as an agent at every price change 206, 207, 208. However, if the minimum bid market does not include a bid or offer price that gives the clearing house a neutral position as an agent (a position whereby it needs to do nothing other than execute Exempt Market Crossings 211) then the clearing house automatically gives a trading order and joins the queue in the same way as other investors if any contract is not backed or supported by the minimum required assigned funds or if an investor has selected a trading method that directs the clearing house to act as agent to increase the investor's number of contracts 213. The clearing house as an agent gives trading orders at the market offer price if selling and the market bid price if buying except with Exempt Opening Crossings. This may mean in a rapidly moving market that the clearing house, in it's agent activities, is unable to novate contract holders or close out contracts in the market. The clearing house in it's agent activities will give priority in its trading orders to contracts that have a deficiency of assigned funds. The clearing house computer will proportionally then randomly allocate sales within each category of trading order from its agent activities if it cannot fulfil all orders at a preferred price.

If the clearing house as an agent is attempting to dispose 202 of contracts in the market or if an investor has a deficiency in his minimum required assigned funds 209 at one of the market parameters in a contract class (contract type, month and trading position) and any of the contra position contracts appear on market on one of the market parameters 206 where an investor has a deficiency then the clearing house closes 210 out sufficient of those contracts in an Exempt Market Crossing 211 so that the investor has no deficiency in his minimum required assigned funds at the price of the Exempt Market Crossing. The investor thus then has the minimum required assigned funds for the number of contracts he holds at the price of the Exempt Market Crossing.

The clearing house would execute the Exempt Market Crossing 211 at the market price offered or market price bid by the contra position contract holder. When selecting the specific contracts out of a contract holder's batch of contracts for disposal, the clearing house will in each circumstance randomly select either a LIFO or FIFO method of stock control unless contra position contracts to others in the batch appear on market. In this circumstance, the clearing house will dispose of the contracts that can be applied in an Exempt Market Crossing 211.

If an investor directly closes out all or part of his position in the market 112 the clearing house automatically adjusts, if need be, the number of contracts that it is attempting to dispose of in the market on that investor's behalf. Similarly, if the investor has given and had accepted a direct trading order to close out a position that trading order is automatically adjusted (if necessary) in regards to quantity after acceptance, if in the intervening time the clearing house disposes of contracts on behalf of that investor prior to the investor's direct trading order being executed.

The more the market moves against an investor with an insufficient assigned funds position for a contract class the more of the investor's contracts the clearing house must attempt to dispose of in the market 202, 210. In a normal market the clearing house will be able to novate 203 contract holders or close out contracts in the market 211, or both, so that an investor has sufficient assigned funds to cover the remaining number of contracts held. However, traumatic or surprise events do at times cause a market to gap or rapidly move in one direction. For example, assume the contracts are leveraged 25:1 and the market suddenly gaps 10% on negligible turnover and the clearing house cannot novate the contract holder nor close out the contracts it wishes to in the market nor does the opportunity arise for it to perform any Exempt Market Crossings. An investor on the wrong side of the market may have insufficient assigned funds to cover the gapping movement. At 25:1 leveraging the investor may have only provided 4% (1/25×100%) of the contract value. The clearing house automatically follows the Contract Exchange Rules and closes out the investor's contract in an Exempt Closing Crossing 205 at a price equal to the price that his assigned funds in that contract class are first exhausted (zero) once that price is between the market parameters or at the market offer parameter if the investor has a long position or at the market bid parameter if the investor has a short position. That investor has no further liability.

With every transaction that a contract is opened rather than novation occurring, the clearing house simultaneously enters into a long contract and a short contract. If an investor's contract is closed out (as the clearing house has been consistently unsuccessful in its market activities, perhaps due to a gapping market) in a clearing house executed Exempt Closing Crossing 205 with other investors being excluded from participation, the investor with the contra position contract also has his contract simultaneously and automatically closed out by the exercise of the clearing house held option (as stated in the Contract Exchange Rules) even without his presence in the market. The investor on the right side of the market has made a 100% gain on his minimum required assigned funds invested in the contract from the later of the time that the contract position was established or the last point of time that the contra position contract to his contract was backed or supported by the minimum required assigned funds prior to the Exempt Closing Crossing.

The contract can only be transferred through the Contract Exchange. All settlements on the Exchange are in cash with no physical delivery 111, 115, 220. Mandatory cash settlement of a contract occurs automatically at the termination time on the termination day of the contract at the cash settlement price, as all contracts with the same termination time (and date) that are open at that time are then closed out at that time 110, 111.

The Trading Order

An investor must use Identification and Passwords to log on to the trading system in a similar way to other screen trading systems. To gain entry to the market, execute a trading order or have a trading order appear on the screen an investor must give a trading order making up to nine statements:

(1) the contract type
(2) the contract month
(3) the trading position: buyer or seller
(4) the direction to open or expand a position, to close or reduce a position, to terminate a prior trading order, to adjust a prior trading order. Only the investor's last prior trading order can be terminated or adjusted in a contract class.
(5) the quantity of contracts
(6) the price of the contracts either "now"—at the earliest opportunity, or a price limit per contract. The price limit sub-statement and the "now" sub-statement can both be made separately or the sub-statements can be made concurrently with "now" activated first if lot, or until blocked by the price limit.)
(7) the preferred trading method either accept accumulation of surplus assigned funds, or build up contract numbers
(8) the mandate for the clearing house as agent at the termination date of the contract to reinvest in the next contract month on a similar basis to the degree that assigned funds allow, or the standard cash settlement at the termination date.
(9) the nature of the limit on the transfer of funds to be assigned to trading for the contract class. For instance:
 excluded contract class assigned funds accounts or cash management trust accounts;
 assigned funds limit;
 assigned funds limit equivalent to all the investor's funds in his cash management trust account and any surpluses in other contract assigned funds accounts; or
 solely included contract class assigned funds accounts or cash management account.

In relation to the transfer of funds the second or the third sub-statements above must be provided if the statement is to be made. The sequence and priorities of sub-statements may be relevant.

The nine statements must be made when initially opening a position in a contract class although only the first six statements may need to be made when adding to a position. The first six statements only must be made when closing a position. The first four statements only must be made when terminating a trading order. At least the first four statements plus other(s) must be made when adjusting a trading order.
Directions to Open/Close/Terminate/Adjust If an investor has both long and short positions open in a contract type he must provide the normal minimum required assigned funds for each long position and each short position. Therefore it is important to state that a position is being closed out if that is the intention. If an investor wishes to terminate or cancel a trading order he can do so at any time prior to its execution. Trading orders remain active until terminated. Similarly an investor can adjust or amend a trading order (but not alter information in the first three statements) although the timing of his trading order may be clanged for queuing purposes. If any information in the first three statements needs altering, the trading order should be terminated and a replacement trading order given.
Price An investor who gives a trading order with a "now" and a bid price above the market offer price or a "now" with an offer price below the market bid price can only move the market (if the trading order is not executed) by market ticks to his price limit although the timing of his offer or bid is recorded at his price limit for queuing purposes. The Market Maker contributes to the successful operation of the system as he always provides a minimum bid market and thus helps prevent crazy price errors suddenly appearing on the screen and also helps prevent buy-sell trading order reversal errors outside the market parameters. Bids higher than the market offer price (ie. a bid not including a "now") and offers lower than the market bid price (ie. an offer not including a "now") would be confirmed back to the investor prior to being accepted. This is to encourage investors only to use a price limit sub-statement by itself when the investor's bid price is not greater than the market offer price or the investor's offer price is not less than the market bid price. An accepted trading order with a bid higher than the market offer price or an accepted trading order with an offer lower than the market bid price will be executed in the same way as a trading order with a "now" and a price limit.

A further safety limit will be placed on all trading orders. A trading order will be terminated by the clearing house unless adjusted by the investor (for confirmation purposes) if and when the trading order (and perhaps other trading orders) moves the market more than the equivalent of the leveraging ratio (ie. if the leveraging ratio is 10:1, 10% of the market price). This rule will place a limit on investor trading order errors that may be particularly relevant in a thinly traded contract type if no arbitrager is present in or attracted to the market.
Trading Methods An investor can only use one trading method at a time in each contract class and a trading method cannot be altered while a position is open. All investors are offered two alternative trading methods with the clearing house acting in the market as agent on behalf of the investor when required to do so. In broad terms either the investor accumulates any gained assigned funds 219 or the investor invests any gained assigned funds into further contracts 213.

If accumulating funds, the minimum required assigned funds are automatically topped up when needed from surplus assigned funds when they are available. If no surplus assigned funds are available the clearing house is to dispose of the contracts if necessary so that the adjusted number of contracts are covered by the minimum required assigned funds.

If investing, the minimum required assigned funds are automatically topped up when needed from surplus assigned funds when they are available. If no surplus assigned funds are available the clearing house is to dispose of the contracts if necessary so that the adjusted number of contracts are covered by the minimum required assigned funds. The clearing house is to reinvest all surplus assigned funds over the initial level of the surplus assigned funds account into contracts of the same contract class. If surplus assigned funds are applied to, or used to top up the minimum required assigned funds they are accumulated again (subject to favourable price movements) to their previous maximum level (plus fractions) 218.

Mandate to Reinvest the Cash Settlement

This facility allows an investor to make a long term investment if he wishes, by giving an initial trading order with appropriate assigned funds. A position can automatically be rolled-on (rolled over) at the termination date of each contract. This involves the investor giving the clearing house a mandate to act as agent to reinvest the investor's mandatory cash settlement funds into contracts in the next later-dated contract month on a similar basis to the extent that the investor's mandatory cash settlement funds allow. The mandate given by an investor must be consistent within a contract class while a position is open. If the investor is using a trading method that accumulates surplus assigned funds 219 the clearing house will attempt to re-establish a position with the same number of contracts previously held by the investor. If the investor is using a trading method that increases the number of contracts 213 when the appropriate assigned funds are available then the clearing house will attempt to re-establish a position with as many contracts as possible with the available funds. When given such a mandate by an investor the clearing house will cross in Exempt Opening Crossings as many contracts as possible at the later-dated contract last market price at the termination time of the terminated contract. The balance of the contracts will immediately be bought or sold in the market by a clearing house "now" trading order at the lowest offer market price(s) if buying and the highest bid market price(s) if selling. The number of contracts the clearing house intends to buy or sell in this fashion will be shown on the screen one hour prior to the termination time to encourage as many arbitragers and traders into the market as possible so that the clearing house can obtain the best possible price for the investors for whom it is acting. The clearing house computer will proportionally then randomly allocate the investors contracts that had been successfully traded in the Exempt Opening Crossing and proportionally then randomly allocate the remaining contracts traded in the market outside the Exempt Opening Crossing. A clearing fee will be applicable on all contracts bought and sold.

Internal Transfer of Funds

An investor may have a number of positions open at one time. The internal funds transfer system is structured to provide the investor with a great deal of flexibility. Upon receiving a trading order 105 the minimum required assigned funds (plus surplus assigned funds if so directed by the investor) are automatically transferred 103, 104, if required, to the investor's appropriate contract class assigned funds account with the clearing house. All assigned funds accounts are part of the books of accounts of the clearing house. If the investor already has sufficient surplus assigned funds in the appropriate contract class assigned funds account no funds are necessarily required from his cash management trust account or from other assigned funds accounts (with surpluses). Only an investor's surplus assigned funds (including unrealised assigned funds but excluding the minimum required assigned funds for an incompleted order) can be swept to his cash management trust account at any time. The investor as a statement in his trading order can include a global limit on the sweep authorised from his cash management trust account or any of his other contract class assigned funds accounts to his specified contract class assigned funds account. In such circumstances priority will be given to sweeping funds from the investor's cash management trust account prior to his other assigned funds accounts unless the investor has given a contrary instruction in his trading order. If in the trading order or in subsequent directions the investor specifies the contract class assigned funds accounts available for sweeping then those accounts will be swept when and if required in the order of priority stated in the trading order or in subsequent directions assuming surplus assigned funds are available in those accounts. An investor can specifically exclude contract class accounts or the cash management trust account from sweeping. If an investor does not restrict the funds to be assigned to a contract class assigned funds account then his whole cash management trust account balance is transferred to that assigned funds account and surpluses from other assigned funds accounts are automatically swept to that assigned funds account if required. The investor can at any time add to the assigned funds of a specified contract class assigned funds account. This can involve either a sweep from the investor's cash management trust account or a sweep when required from one or more of the investor's other contract class assigned funds accounts to the specified contract class assigned funds account.

For overall consistency and to facilitate simpler funds calculations for investors, all contracts will be quoted on a price basis including contracts that have an underlying product of a debt security or a debt security option.

Market Maker

The clearing house will appoint a Market Maker for each contract type. The Market Maker will be offered fee-free trading on market making activities and a discount on other contracts traded in that contract type, or paid a fee for his services. The clearing house may also provide the Market Maker with categorised market information on the selected trading methods and levels of assigned funds for the relevant contract class. The Market Maker's role will be to automatically make a market for one or two contracts (ie. a programmed computer Market Maker with an underlying clearing house approved minimum contract market making program) so that there is never more than a minimum bid between the quoted buy and sell prices with the market always being a minimum bid market at the last sale price. Prices will thus only change at a minimum bid at a time. In practice there will be a minimum of say one or two seconds between each change of the market parameters but there need not be a time period between sales at the same market parameters. The last buyer of a contract has the right to become the first seller in the queue (ie. jump the queue) of a contract at a tick lower price. Similarly the last seller of a contract has the right to become the first buyer in the queue of a contract at a tick higher price. This will help facilitate a minimum bid market and reduce the costs of the Market Maker in a gapping market. The Market Maker will always top up his minimum required assigned funds if needed in his one contract market making activities. In a gapping market the Market Maker may be trading with himself. If for extreme example a market gaps 10% and the Market Maker is trading with himself in the most conservative way possible then the most the Market Maker can loose is 10% of the value of one contract. Most contract types will have a moderate value (eg. a gold contract will be one ounce). This will also reduce the costs of the Market Maker and the need for his services.

Odd Lot Facilitator

An odd lot facility will be provided to increase the average size of each trade for large investors, execute many small trading orders instantly, reduce the electronic equivalent of paper work and encourage all investors regardless of size. Each contract type will have a designated marketable parcel. For example a marketable parcel in gold may be 100 contracts (100 ounces). A marketable parcel may be 10,000 contracts if the underlying product is a low priced product such as a low priced equity or a low priced option. An investor can open and close and buy and sell contracts in odd lot numbers in quantities as small as one contract although the minimum clearing fee charged is the fee for a marketable parcel.

However, to directly execute a trading order smaller than a marketable parcel an investor can only deal at the market offer price if he is buying and the market bid price if lie is selling. A trading order smaller than a marketable parcel with contrary price instruction will be rejected but an investor with an odd lot is not forced to deal at a price that is not one of the market parameters at the time the trading order was received. Odd lots smaller than a marketable parcel other than odd lots being dealt with by the clearing house in it's agent market activities must be bought from and/or sold to the Odd Lot Facilitator or the Market Maker. The Odd Lot Facilitator who is not subject to queuing rules or standard clearing fees with odd lots must bid for odd lots at the market bid price for one less contract than a marketable parcel if a marketable parcel is being bid for in the market and must offer for odd lots at the market offer price for one less contract than a marketable parcel if a marketable parcel is being offered in the market (ie. the Odd Lot Facilitator will not be disadvantaged in a gapping market). The Odd Lot Facilitator must use a clearing house approved minimum odd lot computerised dealing program. The Odd Lot Facilitator position is not necessary for the success of the system but it contributes a little. Also, if it is in place it may be useful if the market system ever appeared to be over loading.

Terms of a Long and Short Contract

The contract 18 is a synthetic financial instrument originated 107 by the clearing house of the Contract Exchange.

When the contracts are traded 108 contract holders may be novated. The process of novation of a contract holder involves one party to a contract being substituted for another party and taking over the former party's contractual responsibilities. However, if a new contract is written, opened or established the position is as follows: The buyer of a contract enters into a separate contract with the clearing house. The seller of a contract enters into another separate contract with the clearing house. The clearing house does not enter into a contract with a buyer of a contract if the clearing house is unable to contract with a seller at the same price. Similarly the clearing house does not enter into a contract with a seller of a contract if the clearing house is unable to contract with a buyer at the same price. The clearing house is thus always perfectly hedged in all its "principal" positions and always remains that way. For Exchange accounting purposes, the clearing house is not in a principal position. A contract holder acknowledges in his initial agreement-contract (the Trading Agreement and Risk Disclosure Statement that binds a potential contract holder to the Contract Exchange Rules) that all contract holders or future contract holders can be novated or closed out in a contract by the clearing house at any time within the Rules and at the absolute (automated) discretion of the clearing house. A contract holder also acknowledges in the Trading Agreement and Risk Disclosure Statement that the clearing house enters into contra position contracts in relation to all contracts and that if the assigned funds covering a contra position contract becomes zero at any price between the market parameters or on the appropriate market parameter, then the then current contract holder's contract can be terminated by the contract being closed out in an Exempt Closing Crossing even if that contract was obtained after a series of novations.

A contract holder can close out a contract position 112 in the market at any time assuming buyers and sellers can agree on price.

A party to a contract is the beneficial owner of the proceeds of a unique indivisible financial package contract. The contract is a binding obligation enforceable at law requiring a mandatory cash settlement based on a settlement price of a specific quantity of a specified type of product at a agreed price, place and time. The clearing house holds an option on the contract. The option is exercisable at any time under certain conditions 109, 200. The option is granted to and held by the clearing house in all cases and circumstances as irrevocable agent for the contract holder. In relation to a contract that the clearing house has novated the contract holder by exercising its option, the option is re-granted to the clearing house upon novation of the contract. The clearing house ceases to hold an option on a contract once the contract is closed out. All proceeds derived from agent activities of the clearing house accrue to the relevant beneficial owner. The conditions or terms of the contract form part of the Contract Exchange Rules.

Market Price and Leveraging Ratio Assumptions (1) S=the last market price that the seller's contract was backed by the minimum required assigned funds.
(2) B=the last market price that the buyer's contract was backed by the minimum required assigned funds.
(3) the contract type is leveraged for example at 25.1. That is, 4% of the contract value at the market price is required as funds in the investors' appropriate contract class assigned funds account as the minimum required assigned funds.
(4) the buyer's contract and the seller's contract are the contra position contracts to each other.
(5) historical data is constantly updated.

Long Contract

The buyer and holder of a contract has a contract requiring mandatory cash settlement based on the settlement price of a specific quantity of specified type of purchased product at an agreed price, place and time. The clearing house holds a call option on the contract. The call option is exercisable at any time under certain conditions. The call option is granted to and held by the clearing house as irrevocable agent for the contract holder. The conditions or terms of the (one) call option held by the clearing house as irrevocable agent are described below in parts (i) and (ii).

(i) A "progress" call option on the contract with a strike price of S+S/25.

If the contra position contract holder's (seller's) assigned funds in the contract falls to zero at a price between the market parameters or at the market bid parameter, then the clearing house performs an Exempt Closing Crossing 205 at that price. A contract holder (the buyer) with assigned funds (including unrealised assigned funds) equal to or greater than the minimum required assigned funds cannot prevent the clearing house exercising its "progress" call option. However, if the contra position contract assigned funds account always has some assigned funds, then the clearing house will never need to exercise its "progress" call option in relation to the buyer's contract.

In practice the clearing house would only exercise its "progress" call option on the contract by executing an Exempt Closing Crossing if the clearing house is generally unsuccessful in its market activities (perhaps due to a gapping market) in relation to the contra position contract 204 ie. a seller must sell at the bid price the number of contracts bid by the clearing house for the clearing house to be successful in all its agent buying market activities indirectly relevant to the buyer's contract.

(ii) A "protection" call option on the contract with a strike price between <B and down to and including B−B/25.

In practice the clearing house would always attempt to exercise its "protection" call option by attempting to novate 203 the contract holder or close out the contract by selling in the market at the first opportunity below B 201, at either the first market offer parameter opportunity below B taking into account the queuing rules by offering the market offer parameter price or in an Exempt Market Crossing 211 with the contra position contract at a market bid price or a market offer price if such an opportunity arises. If there is no market opportunity 204 in relation to the contract between <B and down to and including B−B/25 (and a buyer must purchase at the offer price the number of contracts offered by the clearing house for the clearing house to be successful in all its agent selling market activities relevant to the contract other than with an Exempt Market Crossing) the clearing house would exercise its "protection" call option at B−B/25 by closing out the contract in an Exempt Closing Crossing 205 with other investors being excluded from participation. The clearing house only closes out the contract in an Exempt Closing Crossing if the contract holder's whole assigned funds position in the contract class is zero between the market parameters or at the market offer parameter. If a contract holder has a parcel of contracts the clearing house only sells sufficient contracts to bring the position to within the acceptable leveraging ratio at that sale price. A contract holder who has assigned funds (including unrealised assigned finds) equal to or greater than the minimum required assigned funds at the market bid price prevents the exercise of the "protection" call option and does so as long as his assigned funds remain equal to or greater than the minimum required assigned funds.

Short Contract

The seller and holder of a contract has a contract requiring mandatory cash settlement based on the settlement price of a specific quantity of specified type of sold product at an agreed price, place and time. The clearing house holds a put option on the contract. The put option is exercisable at any time under certain conditions. The put option is granted to and held by the clearing house as irrevocable agent for the contract holder. The conditions or terms of the (one) put option held by the clearing house as irrevocable agent are described below in parts (i) and (ii).

(i) A "progress" put option on the contract at a strike price of B−B/25.

In practice the clearing house would only exercise its "progress" put option on the contract by executing an Exempt Closing Crossing 205 if the clearing house is generally unsuccessful in its market activities (perhaps due to a gapping market) in relation to the contra position contract 204 ie. a buyer must buy at the offer price the number of contracts offered by the clearing house for the clearing house to be successful in all its agent selling market activities indirectly relevant to the contract. If the contra position contract holder's assigned funds in the contract falls to zero at a price between the market parameters or at the market offer parameter, then the clearing house performs an Exempt Closing Crossing 205 at that price. A contract holder with assigned funds (including unrealised assigned funds) equal to or greater than the minimum required assigned funds cannot prevent the clearing house exercising its "progress" put option. However, if the contra position contract assigned funds account always has some assigned funds then the clearing house will never need to exercise its "progress" put option.

(ii) A "protection" put option on the contract at a strike price between >S and up to and including S+S/25.

Its practice the clearing house would always attempt to exercise its "protection" put option by attempting to novate 203 the contract holder or close out the contract by buying in the market at the first opportunity above S 201 at either the first market bid parameter opportunity above S taking into account the queuing rules by bidding the market bid parameter price or in an Exempt Market Crossing 211 with the contra position contract at a market offer price or a market bid price if such an opportunity arises. If there is no market opportunity 204 in relation to the contract between >S and up to and including S+S/25 (and a seller must sell at the bid price the number of contracts bid by the clearing house for the clearing house to be successful in all its agent buying market activities other than with an Exempt Market Crossing), the clearing house would exercise its "protection" put option at S+S/25 by closing out the contract in an Exempt Closing Crossing 205 with other investors being excluded from participation. The clearing house only closes out the contract in an Exempt Closing Crossing if the contract holder's whole assigned funds position in the contract class is zero between the market parameters or at the market bid parameter. If a contract holder has a parcel of contracts the clearing house only buys sufficient contracts to bring the position to within the acceptable gearing ratio at that purchase price. A contract holder who has assigned funds (including unrealised assigned funds) equal to or greater then the minimum required assigned funds at the market offer price prevents the exercise of the "protection" put option and does so as long as his assigned funds remain equal to or greater than the minimum required assigned funds.

The Clearing House "Progress" Option

It is current practice for many fund managers and investors to write options on specific securities or on portfolios. These options are sometimes exercised and sometimes not exercised. The contract clearing house only exercises its "progress" options when it has been unable to dispose of the contracts that is regards as the contra position contracts in the market, due to insufficient market demand for those contra position contracts and as a consequence the contra position contract holder's assigned funds had fallen to zero.

The clearing house at its absolute (automated) discretion may within the Rules novate a contract holder at any time or switch or novate a contract at any time. The holders of a contract may have been novated hundreds of times in relation to that contract. Similarly the holders of a contra position contract may have been novated hundreds of times in relation to that contra position contract.

Similarly in relation to a contract the contra position contract may have been also novated or switched (ie. the contra position contract, not its holder) many times as the clearing house may close out a long contract at the same time it closes out an unrelated short contract and thus matches the two remaining open contracts. Of those two remaining contracts, each one becomes the contra position contract to the other. If the clearing house is not able to dispose of any contra position contracts in the market or is only able to dispose of a portion of the contra position contracts it wishes to in the market including Exempt Market Crossings 211, it must close out the balance that had not been successfully disposed of in the market in an Exempt Closing Crossing (with other investors excluded from participation) when the assigned funds position on those contra position contracts becomes zero 205. If at any particular price the clearing house can only fulfil part of its attempted novation or closing out of contracts by acting in the market on a number of different investors' contracts, then the clearing house computer would proportionally then randomly select those contracts of the relevant contract holders that had been successfully traded in the market and those that had been closed out in Exempt Closing Crossings.

Underlying Products Traded

The contracts could be traded on all homogeneous products that have an existing market such as commodities, currencies, any financial instruments that can be priced in an accepted way (including bonds, bills etc.), any financial index, a range of equities and options traded by any option clearing house. The range of contract types could be expanded to cover a wider selection of products as the level of demand is determined in each area. The contracts could also be traded on any derivative even without an existing market.

Leveraging Ratio of Each Contract Type

The leveraging (gearing) ratio with a contract is the ratio between the value of the underlying product and the minimum required assigned funds. Each contract type will have its own set leveraging ratio that applies to all buyers and sellers (but not the clearing house as it is perfectly hedged in its "principal" positions). The leveraging ratio will be partly dependant on the volatility of the price of the underlying product and partly dependant (at least initially) on the depth of turnover of the underlying product. For example, a leveraging ratio of a contract type might be similar but a little greater than that applying to clearing members of futures exchanges for a comparable futures contract type, 2:1 or 3:2 if the underlying product is a at-the-money option and 2:1 to 20:1 if the underlying product is a company share. The trading history of each underlying product and associated products will be closely examined before determining the appropriate leveraging ratio for each contract type. Leveraging ratios will be set at a level so that the clearing house will rarely (say very approximately once or twice a year) have to perform any Exempt Closing Crossings in the contract type. For example, examination of gold trading and gold futures trading in world markets may result in a leveraging ratio of say 25:1. If the underlying product of the contract type is an option more frequent Exempt Closing Crossings will be acceptable. Leveraging ratios must be established by the time contract trading commences in a contract month and cannot be altered prior to the termination of trading in that contract month.

Currency Applicable for Trading

All trading will be done in the currency that the head product is usually traded, eg. US dollars for US Treasury Bonds, Bills and Notes, Eurodollars, most commodities, all currencies, and US equities, Yen for Japanese government bonds, Euroyen and Japanese equities, Australian dollar for Australian bank bills, Australian treasury bonds and Australian equities, Mark for German government bonds and German equities, French francs for Notional bond and French equities, UK pound for Gilts, UK equities etc., etc. The cash management trust will have separate accounts for each currency.

So an investor with a US dollar cash management account who gave a buy or sell trading order in Japanese government bond contracts would automatically, if need be, have his clearing house Japanese government bond (Yen) contract assigned funds account topped up (with the required level of Yen assigned funds for the position given his trading order) from his US dollar cash management trust account or from his other contract class assigned funds accounts if so specified in his trading order.

Nature of the Cash Management Trust

A Manager (ie. a management company) would control the cash management trust linked to the Contract Exchange. The Manager's role would include the investment of funds into liquid short dated government and prime bank debt securities. The Manager would receive a fee for acting as Manager. An independent trustee company would act as Trustee and be responsible for safeguarding the interests of cash management trust investors (unit holders) and ensuring the provisions of the trust deed are followed. The head office of the Manager would be the same as the head office of the Contract Exchange.

When an investor (unit holder) opens his account the Manager would automatically (in theory) open up accounts in each currency that contract types are traded plus the currency that the investor made his initial deposit. The Manager thus operates a number of trusts denominated in different currencies. The clearing house will keep all its funds held on behalf of investors with the cash management trust. The clearing house in its books of accounts has an assigned funds account for the investor in each contract class in the currency that the contract type is traded. Accounts will have nil balances in them unless the investor's own instructions cause transfers.

Interest will accrue on daily balances in the investor's cash management trust accounts and be credited monthly. Interest will accrue on daily balances in the investor's assigned funds accounts with the clearing house and be credited monthly to the investor's cash management trust accounts. This includes interest on gained unrealised assigned funds but not on lost unrealised assigned funds.

The investors maximum potential loss of assigned funds from trading contracts is equal to the amount in his assigned funds accounts (including unrealised assigned funds). Any funds in any currency above the minimum required assigned funds needed to cover a contract class in any of the investor's assigned funds accounts are automatically converted if available, when and if required into the currency of the investor's contract class that has a deficiency in the minimum required assigned funds.

Conversions of currency will be automatic and at the most competitive rate available to the Manager. The bank (foreign exchange dealer) that offered the narrowest market for each currency will receive the role of Currency Converter and will receive all the business. The Currency Converter will have a clearing house approved currency conversion program. The Currency Converter's quotes could be varied by the Currency Converter at any time as long as the narrowness of the market provided is maintained. The Currency Converter's market will always be automatically available to enable instant sweeping or transfer of funds between accounts denominated in different currencies. Funds are transferred from an investor's clearing house assigned funds account to his cash management trust account in the currency of the account that the funds are coming from. Investors could make withdrawals from the trust in any currency and cheques or the transfer of funds will only be authorised in the same name as the account. Investors that do not wish to use the Currency Converter should deposit funds into their cash management trust account in the currency applicable to the contract types that they wish to trade.

A bank in each major capital city in the world will act as agent for the cash management trust in both receiving funds, issuing and distributing cheques and/or transferring funds to the appropriate bank accounts. The agent banks may receive a fee from the investor for transferring cleared funds to a central investment management location (probably in London or New York) as well as possible foreign exchange business by converting local funds into other currencies. An application form must be completed by the investor and lodged with the agent bank when he deposits funds for transfer to his account at the cash management trust. The initial application form will also include an agreement-contract (Trading Agreement and Risk Disclosure Statement) that binds the investor to the Contract Exchange Rules.

Arbitrage Between Markets

Each contract type will probably have the same termination date as the termination date or expiry date of the dominating futures market or options market with the same underlying product. This win encourage extensive arbitrage with existing markets as prices will come together at these dates. If futures or options are not currently traded on the head product, monthly, bi-monthly or quarterly termination dates could be used.

Contract Notes

It is the investor's responsibility to print out his own contract notes and trading history directly from his own computer. However, contract notes and trading history and cash flow records could be obtained from the clearing house after payment of a fee from the investor's cash management trust account. There is no scrip involved in the system.

Language of the Trading Screen

The trading screen, brochures, User Guide, Rules, Trading Agreement and Risk Disclosure Statement, cash management trust application forms and contract notes etc. would be available in a number of languages including English, Japanese, German, French, Spanish, Italian, Cantonese, mandarin and Portuguese.

Clearing Fee

Each contract type will have a clearing fee (fixed charge) for each contract traded in that contract type (including clearing house agent activities).

Long Contract
Buying 10 contracts at $3700 each, geared at 10:1.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 3700 | 370 | 0 | 0 | 3700 | 10 | 3700 | 0 | (3700) |

1. Transfer of the Minimum Required Assigned Funds for the purchase of 10 contracts is $3700 ($3700 price × 10 contracts ÷ 10 leveraging). A clearing fee is paid from the Cash Management Trust (CMT) and is not shown in these tables.

Long Contract
Price moves in favour of long contract holder of Example 1.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 3700 | 370 | 0 | 0 | 3700 | 10 | 3700 | 0 | (3700) |
| 2. | 3701 | 370.1 | 10 | 10 | 3710 | 10 | 3701 | 9 | 0 |

2. A $1 movement in the contract price from $3700 to $3701 results in a gain of $10 ($1 × 10 contracts). This $10 is transferred from the Minimum Required Assignment Funds Account of the counter party who holds the contra position (short) contract. Since the contract price has risen, the assigned funds must rise by $1 ($1 rise × 10 contract ÷ 10 gearing), so the long contract holder has only $9 Surplus Assigned Funds ($10 profit − $1 extra assigned funds required).

Long Contract
Price moves against long contract holder of Example 2.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 3700 | 370 | 0 | 0 | 3700 | 10 | 3700 | 0 | (3700) |
| 2. | 3701 | 370.1 | 10 | 10 | 3710 | 10 | 3701 | 9 | 0 |
| 3. | 3700 | 370 | −10 | 0 | 3700 | 10 | 3700 | 0 | 0 |

3. A $1 movement is the contract price from $3701 to $3700 results in a loss of $10 ($1 × 10 contracts). This is transferred to the counter party. The fall in contract price reduces the Minimum Required Assigned Funds by $1 and this together with the $9 Surplus Assigned Funds makes up the amount required for transfer.

Long Contract
Price continues to move against long contracts holder of Example 3.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 3700 | 370 | 0 | 0 | 3700 | 10 | 3700 | 0 | (3700) |
| 2. | 3701 | 370.1 | 10 | 10 | 3710 | 10 | 3701 | 9 | 0 |
| 3. | 3700 | 370 | −10 | 0 | 3700 | 10 | 3700 | 0 | 0 |
| 4. | 3699 | 369.9 | −10 | −10 | 3590 | 10 | 3699 | −9 | 0 |

4. A further $1 movement in the contract price from $3700 to $3699 results in a loss of a further $10. This is transferred to the counter party. The fall in contract price reduces the Minimum Required Assigned Funds required by $1 leaving a deficit of $9 in assigned funds.

Long Contract
Closing a position by selling the 10 contracts of Example 4.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 3700 | 370 | 0 | 0 | 3700 | 10 | 3700 | 0 | (3700) |
| 2. | 3701 | 370.1 | 10 | 10 | 3710 | 10 | 3701 | 9 | 0 |
| 3. | 3700 | 370 | −10 | 0 | 3700 | 10 | 3700 | 0 | 0 |
| 4. | 3699 | 369.9 | −10 | −10 | 3590 | 10 | 3699 | −9 | 0 |
| 5. | 3699 | 369.9 | 0 | −10 | 0 | 0 | 0 | 0 | 3690 |

5. The 10 contracts are sold at $3699 each, and the credit balance is transferred to the Cash Management Trust. The total loss on the position is $10 due to the price dropping from $3700 to $3699.

Long Contract
Building up contracts from an initial position of holding
100 contracts purchased at $400 each leveraged at 10:1.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 400 | 40 | 0 | 0 | 4000 | 100 | 4000 | 0 | (4000) |
| 2. | 402 | 40.2 | 200 | 200 | 4200 | 100 | 4020 | 180 | 0 |
| 3. | 402 | 40.2 | 0 | 200 | 4200 | 104 | 4180.80 | 19.20 | 0 |

2. An increase of $2 in the contract price results in a gain of $200 and the need to increase the minimum required assigned funds by $20, leaving Surplus Assigned Funds of $180.

3. The $180 Surplus Assigned Funds is used to purchase 4 more contracts, requiring an increase in the minimum required assigned funds of $160.80 (40.2 × 4), to $4180.80, and leaving Surplus Assigned Funds of $19.20.

Long Contract
Reducing contracts from an initial position of holding
100 contracts purchased at $400 each, leveraged at 10:1.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 400 | 40 | 0 | 0 | 4000 | 100 | 4000 | 0 | (4000) |
| 2. | 399.40 | 39.94 | −60 | −60 | 3940 | 100 | 3994 | −54 | 0 |
| 3. | 399.40 | 39.94 | 0 | −60 | 3940 | 98 | 3914.12 | 25.88 | 0 |

2. A decrease of 60c in the contract price results in a loss of $60 and a reduction in the minimum required assigned funds of $6, leaving an assigned funds deficit of %54.

3. Because no funds are available for transfer from the Cash Management Trust, the deficit is made up by the sale of two contracts in the market by the Clearing House: an Exempt Market Crossing would take place only if a counter party had appeared on the market parameter and in that case the two contracts would have been closed out. The sale reduces the minimum required assigned funds by $79.88 (39.94 × 2 contracts) leaving a surplus of $25.88. If the tick was 20c rather than 60c then the reduction contract price from $400 to $399.40 would have taken place in three steps. At $399.80 or $399.60 the Clearing House would have attempted to remove the contract holders deficit by selling only one contract.

Long Contract
An Exempt Closing Crossing when the contract price gaps down to bid and
offer parameters of $359 and $359.20 for the contract holder of Example 7.
Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 400 | 40 | 0 | 0 | 4000 | 100 | 4000 | 0 | (4000) |
| 2. | 399.40 | 39.94 | −60 | −60 | 3940 | 98 | 3914.12 | 25.88 | 0 |
| 3. | 359.196 | 35.9196 | −3940 | −4000 | 0 | 0 | 0 | 0 | 0 |

3. An Exempt Closing Crossing on the investors 98 contracts due to the exercise of the Clearing House "protection" call option at precisely $359.196 where the loss (($399.40 − $359.196) × 3940) equals the remaining assigned funds, as no further funds were made available for transfer from the Cash Management Trust. In practice, the loss would be transferred to the credit of the coutner party tick by tick.

Long Contract
Typical price fluctuations for 400 contracts purchased at $100 each, leveraged at 20:1.

Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 100 | 5 | 0 | 0 | 2000 | 400 | 2000 | 0 | (2000) |
| 2. | 98 | 4.9 | −800 | −800 | 1200 | 244 | 1195.6 | 4.4 | 0 |
| 3. | 102 | 5.1 | 976 | 176 | 2176 | 244 | 1244.4 | 931.6 | 0 |
| 4. | 99 | 4.95 | −732 | −556 | 1444 | 244 | 1207.8 | 238.2 | 0 |
| 5. | 95 | 4.75 | −976 | −1532 | 468 | 98 | 465.5 | 2.5 | 0 |
| 6. | 94.5 | 4.725 | −49 | −1581 | 419 | 88 | 415.8 | 3.2 | 0 |
| 7. | 95 | 4.75 | 44 | −1537 | 463 | 88 | 418 | 45 | 0 |
| 8. | 95.2 | 4.76 | 17.6 | −1519.4 | 480.6 | 88 | 418.88 | 61.72 | 0 |
| 9. | 95.3 | 4.765 | 8.8 | −1510.6 | 489.4 | 88 | 419.32 | 70.08 | 0 |
| 10. | 95.6 | 4.78 | 26.4 | −1484.2 | 515.8 | 88 | 420.64 | 95.16 | 0 |
| 11. | 93.3 | 4.665 | −202.4 | −1686.6 | 313.4 | 67 | 312.555 | 0.845 | 0 |
| 12. | 98 | 4.9 | 314.9 | −1371.7 | 628.3 | 67 | 328.3 | 300 | 0 |
| 13. | 99 | 4.95 | 67 | −1304.7 | 695.3 | 67 | 331.65 | 363.65 | 0 |
| 14. | 100 | 5 | 67 | −1237.7 | 762.3 | 67 | 335 | 427.3 | 0 |
| 15. | 105 | 5.25 | 335 | −902.7 | 1097.3 | 67 | 351.75 | 745.55 | 0 |
| 16. | 110 | 5.5 | 335 | −567.7 | 1432.3 | 67 | 368.5 | 1063.8 | 0 |
| 17. | 112 | 5.8 | 134 | −433.7 | 1566.3 | 67 | 375.2 | 1191.1 | 0 |

Short Contract
Progress the control starting position of Example 9, where 400 contracts to sell were sold at $100 each, leveraged at 20:1.

Trading Account

| | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 100 | 5 | 0 | 0 | 2000 | 400 | 2000 | 0 | (2000) |
| 2. | 98 | 4.9 | 800 | 800 | 2800 | 400 | 1960 | 840 | 0 |
| 3. | 102 | 5.1 | −1600 | −800 | 1200 | 235 | 1198.5 | 1.5 | 0 |
| 4. | 99 | 4.95 | 705 | −95 | 1905 | 235 | 1163.25 | 741.75 | 0 |
| 5. | 95 | 4.75 | 940 | 845 | 2845 | 235 | 1116.25 | 1728.75 | 0 |
| 6. | 94.5 | 4.725 | 117.5 | 962.5 | 2962.5 | 235 | 1110.375 | 1852.125 | 0 |
| 7. | 95 | 475 | −117.5 | 845 | 2845 | 235 | 1116.25 | 1728.75 | 0 |
| 8. | 95.2 | 4.76 | −47 | 798 | 2798 | 235 | 1118.6 | 1679.4 | 0 |
| 9. | 95.3 | 4.765 | −23.5 | 774.5 | 2774.5 | 235 | 1119.775 | 1654.725 | 0 |
| 10. | 95.6 | 4.78 | −70.5 | 704 | 2704 | 235 | 1123.3 | 1580.7 | 0 |
| 11. | 93.3 | 4.665 | 540.5 | 1244.5 | 3244.5 | 235 | 1096.275 | 2148.225 | 0 |
| 12. | 98 | 4.9 | −1104.5 | 140 | 2140 | 235 | 1151.5 | 988.5 | 0 |
| 13. | 99 | 4.95 | −235 | −95 | 1905 | 235 | 1163.25 | 741.75 | 0 |
| 14. | 100 | 5 | −235 | −330 | 1670 | 235 | 1175 | 495 | 0 |
| 15. | 105 | 5.25 | −1175 | −1505 | 495 | 94 | 493.5 | 1.5 | 0 |
| 16. | 110 | 5.5 | −470 | −1975 | 25 | 4 | 22 | 3 | 0 |
| 17. | 112 | 5.6 | −8 | −1983 | 17 | 3 | 16.8 | 0.2 | 0 |

Note how the number of contracts varies from Example 9.

Short Contract
An Exempt Closing Crossing when the contract price gaps upwards.
Includes trading method that builds up contract numbers.
Trading Account

|   | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 100 | 5 | 0 | 0 | 2000 | 400 | 2000 | 0 | (2000) |
| 2. | 98 | 4.9 | 800 | 800 | 2800 | 571 | 2797.9 | 2.1 | |
| 3. | 102 | 5.1 | −2284 | −1484 | 516 | 101 | 515.1 | 0.9 | |
| 4. | 99 | 4.95 | 303 | −1181 | 819 | 165 | 816.75 | 2.25 | |
| 5. | 95 | 4.75 | 660 | −521 | 1479 | 311 | 1477.25 | 1.75 | |
| 6. | 94.5 | 4.725 | 155.5 | −365.5 | 1634.5 | 345 | 1630.125 | 4.375 | |
| 7. | 95 | 4.75 | −172.5 | −538 | 1462 | 307 | 1458.25 | 3.75 | |
| 8. | 95.2 | 4.76 | −61.4 | −599.4 | 1400.6 | 294 | 1399.44 | 1.16 | |
| 9. | 95.3 | 4.765 | −29.4 | −628.8 | 1371.2 | 287 | 1367.555 | 3.645 | |
| 10. | 95.6 | 4.78 | −86.1 | −714.9 | 1285.1 | 268 | 1281.04 | 4.06 | |
| 11. | 93.3 | 4.665 | 616.4 | −98.5 | 1901.5 | 407 | 1898.655 | 2.845 | |
| 12. | 97.972 | 4.8986 | −1901.504 | −2000 | 0 | 0 | 0 | 0 | |
| 13. | 98 | 4.9 | 0 | −2000 | 0 | 0 | 0 | 0 | |
| 14. | 99 | 4.95 | 0 | −2000 | 0 | 0 | 0 | 0 | |
| 15. | 100 | 5 | 0 | −2000 | 0 | 0 | 0 | 0 | |
| 16. | 105 | 5.25 | 0 | −2000 | 0 | 0 | 0 | 0 | |

12. Exempt Closing Crossing on the investor's 407 contracts due to the exercise of the clearing house "protection" put option.

Long Contract
The Exempt Closing Crossing for the original counter party to Example 11
but counter parties later vary with novation and opening and closing contracts.
Includes trading method that builds up contract numbers.
Trading Account

|   | CTRACT PRICE $ | Assigned Funds per Contract $ | Profit or Loss per Move $ | Total Profit or Loss $ | Remaining Assigned Funds $ | Number of Contracts | Minimum Required Assigned Funds $ | Surplus Assigned Funds $ | Transfer to (from) CMT $ |
|---|---|---|---|---|---|---|---|---|---|
| 1. | 100 | 5 | 0 | 0 | 2000 | 400 | 2000 | 0 | (2000) |
| 2. | 98 | 4.9 | −800 | −800 | 1200 | 244 | 1195.6 | 4.4 | |
| 3. | 102 | 5.1 | 978 | 176 | 2176 | 426 | 2172.6 | 3.4 | |
| 4. | 99 | 4.95 | −1278 | −1102 | 898 | 181 | 895.95 | 2.05 | |
| 5. | 95 | 4.75 | −724 | −1826 | 174 | 36 | 171 | 3 | |
| 6. | 94.5 | 4.725 | −18 | −1844 | 156 | 33 | 155.925 | 0.075 | |
| 7. | 95 | 4.75 | 16.5 | −1827.5 | 172.5 | 36 | 171 | 1.5 | |
| 8. | 95.2 | 4.76 | 7.2 | −1820.3 | 179.7 | 37 | 176.12 | 3.58 | |
| 9. | 95.3 | 4.765 | 3.7 | −1816.6 | 183.4 | 38 | 181.07 | 2.33 | |
| 10. | 95.6 | 4.78 | 11.4 | −1805.2 | 194.8 | 40 | 191.2 | 3.6 | |
| 11. | 93.3 | 4.665 | −92 | −1897.2 | 102.8 | 22 | 102.63 | 0.17 | |
| 12. | 97.972 | 4.8986 | 102.784 | −1794.416 | 205.584 | 0 | 0 | 0 | |
| 13. | 98 | 4.9 | 0 | −1794.416 | 205.584 | 41 | 200.9 | 4.684 | |
| 14. | 99 | 4.95 | 41 | −1753.416 | 246.584 | 49 | 242.55 | 4.034 | |
| 15. | 100 | 5 | 49 | −1704.416 | 295.584 | 59 | 295 | 0.584 | |
| 16. | 105 | 5.25 | 295 | −1409.416 | 590.584 | 112 | 588 | 2.584 | |

12. Exempt Closing Crossing on the investor's 22 contracts due to the exercise of the clearing house "progress call option arising from the exercise of the counter party "protection" put option. The investor reinvests at the first market opportunity at 98.

EXAMPLE 13
Advantages of Contracts as a Hedging Tool
(All prices in US dollars.)

An existing holder of $400,000 of physical gold wishes to continue to hold gold but would like to reduce his risk very substantially. Assume the gold price is $400 per ounce and the gold contract price is $400 (the termination date is near) and the gearing ratio in the gold contract is 40:1. The gold holder sells $400,000 of gold contracts (say 1000 contracts with minimum assigned funds of $10 per contract) by outlaying $10,000 and choosing the trading method that accumulates any surplus assigned funds. Assume the gold price and contract price track each other.

Case 1

The contract price falls to $300 by the termination date of the contract. The investor has made a profit of $100,000 on contracts and a loss of $100,000 on physical gold.

Case 2

The contract price rises to $500 at the termination date of the contract. The clearing house as agent would have progressively closed out the investor's contract position in the market so that his $10,000 in contracts would be lost excluding fractions and $100,000 could be made on the physical gold held. The investors total position therefore has improved $90,000.

Case 3

The contract price gaps down 4% to $384 as soon as the contracts are sold. The contracts are closed out by the clearing house as agent at $390 in an Exempt Closing Crossing giving the investor a profit of 100% on assigned funds, ie. $10,000. A loss of $16,000 has been made on physical gold at the same time. The investor's total loss therefore has been restricted to $6,000.

Case 4

The contract price gaps up 4% to $416 as soon as the contracts are sold. The contracts are closed out by the clearing house as agent at $410 in an Exempt Closing Crossing for a loss to the investor of $10,000. A gain of $16,000 has been made on physical gold. The investor's total gain therefore is $6,000.

TABLE

LEVERAGING = 40 X
MODE = SELL
TRAD. METH. (A)

| GOLD COMFT PRICE $ | ASSIGNED FUNDS per CONTRACT $ | PROFIT or LOSS per MOVE $ | TOTAL PROFIT or LOSS $ | REMAINING ASSIGNED FUNDS $ | NUMBER OF CTRACTS | ASSIGNED FUNDS in CTRACTS $ | SURPLUS ASSIGNED FUNDS $ | TRANSFER to/from CMT $ |
|---|---|---|---|---|---|---|---|---|
| EXAMPLE 13, CASE 1 | | | | | | | | |
| 400 | 10 | 0 | 0 | 10000 | 1000 | 10000 | 0 | −10000 |
| 395 | 9.875 | 5000 | 5000 | 15000 | 1000 | 9875 | 5125 | 0 |
| 390 | 9.75 | 5000 | 10000 | 20000 | 1000 | 9750 | 10250 | 0 |
| 385 | 9.625 | 5000 | 15000 | 25000 | 1000 | 9625 | 15375 | 0 |
| 380 | 9.5 | 5000 | 20000 | 30000 | 1000 | 9500 | 20500 | 0 |
| 375 | 9.375 | 5000 | 25000 | 35000 | 1000 | 9375 | 25625 | 0 |
| 370 | 9.25 | 5000 | 30000 | 40000 | 1000 | 9250 | 30750 | 0 |
| 365 | 9.125 | 5000 | 35000 | 45000 | 1000 | 9125 | 35875 | 0 |
| 360 | 9 | 5000 | 40000 | 50000 | 1000 | 9000 | 41000 | 0 |
| 355 | 8.875 | 5000 | 45000 | 55000 | 1000 | 8875 | 46125 | 0 |
| 350 | 8.75 | 5000 | 50000 | 60000 | 1000 | 8750 | 51250 | 0 |
| 345 | 8.625 | 5000 | 55000 | 65000 | 1000 | 8625 | 56375 | 0 |
| 340 | 8.5 | 5000 | 60000 | 70000 | 1000 | 8500 | 61500 | 0 |
| 335 | 8.375 | 5000 | 65000 | 75000 | 1000 | 8375 | 66625 | 0 |
| 330 | 8.25 | 5000 | 70000 | 80000 | 1000 | 8250 | 71750 | 0 |
| 325 | 8.125 | 5000 | 75000 | 85000 | 1000 | 8125 | 76875 | 0 |
| 320 | 8 | 5000 | 80000 | 90000 | 1000 | 8000 | 82000 | 0 |
| 315 | 7.875 | 5000 | 85000 | 95000 | 1000 | 7875 | 87125 | 0 |
| 310 | 7.75 | 5000 | 90000 | 100000 | 1000 | 7750 | 92250 | 0 |
| 305 | 7.625 | 5000 | 95000 | 105000 | 1000 | 7625 | 97375 | 0 |
| 300 | 7.5 | 5000 | 100000 | 110000 | 1000 | 7500 | 102500 | 0 |
| EXAMPLE 13, CASE 2 | | | | | | | | |
| 400 | 10 | 0 | 0 | 10000 | 1000 | 10000 | 0 | −10000 |
| 405 | 10.125 | −5000 | −5000 | 5000 | 493 | 4991.625 | 8.375 | 0 |
| 410 | 10.25 | −2465 | −7465 | 2535 | 247 | 2531.75 | 3.25 | 0 |
| 415 | 10.375 | −1235 | −8700 | 1300 | 125 | 1296.875 | 3.125 | 0 |
| 420 | 10.5 | −625 | −9325 | 675 | 64 | 672 | 3 | 0 |
| 425 | 10.625 | −320 | −9645 | 355 | 33 | 350.625 | 4.375 | 0 |
| 430 | 10.75 | −165 | −9810 | 190 | 17 | 182.75 | 7.25 | 0 |
| 435 | 10.875 | −85 | −9895 | 105 | 9 | 97.875 | 7.125 | 0 |
| 440 | 11 | −45 | −9940 | 60 | 5 | 55 | 5 | 0 |
| 445 | 11.125 | −25 | −9965 | 35 | 3 | 33.375 | 1.625 | 0 |
| 450 | 11.25 | −15 | −9980 | 20 | 1 | 11.25 | 8.75 | 0 |
| 455 | 11.375 | −5 | −9985 | 15 | 1 | 11.375 | 3.625 | 0 |
| 460 | 11.5 | −5 | −9990 | 10 | 0 | 0 | 10 | 0 |
| 465 | 11.625 | 0 | −9990 | 10 | 0 | 0 | 10 | 0 |
| 470 | 11.75 | 0 | −9990 | 10 | 0 | 0 | 10 | 0 |
| 475 | 11.875 | 0 | −9990 | 10 | 0 | 0 | 10 | 0 |
| 480 | 12 | 0 | −9990 | 10 | 0 | 0 | 10 | 0 |
| 485 | 12.125 | 0 | −9990 | 10 | 0 | 0 | 10 | 0 |
| 490 | 12.25 | 0 | −9990 | 10 | 0 | 0 | 10 | 0 |
| 495 | 12.375 | 0 | −9990 | 10 | 0 | 0 | 10 | 0 |
| 500 | 12.5 | 0 | −9990 | 10 | 0 | 0 | 10 | 0 |
| EXAMPLE 13, CASE 3 | | | | | | | | |
| 400 | 10 | 0 | 0 | 10000 | 1000 | 10000 | 0 | −10000 |
| 390 | 9.75 | 10000 | 10000 | 20000 | 0 | 0 | 20000 | 0 |
| EXAMPLE 13, CASE 4 | | | | | | | | |
| 400 | 10 | 0 | 0 | 10000 | 1000 | 10000 | 0 | −10000 |
| 410 | 10.25 | −10000 | −10000 | 0 | 0 | 0 | 0 | 0 |

EXAMPLE 14

(All prices in Australian dollars.)

An investor sells his $1.8m. Australian indexed share portfolio with the Australian All Ordinaries Index at 1800 as he believes the Australian share market may fall and he invests most of his money in other areas. However, he requires some protection in the short term so he buys Index contracts (gearing at 30:1) at an equivalent price level to the Australian All Ordinaries Index with the termination date near, using the trading method that accumulates any surplus assigned funds. The investor outlays $70,000 covering the size of his original portfolio (say 1,000 contracts with minimum assigned funds of $60 per contract plus $10,000 of surplus assigned funds). Assume the Australian All Ordinaries Index and the Index contract price track each other.

Case 1

The contract price rises to 2000. The investor sells his contracts for a profit of $200,000. The investor's total position is equivalent to as if he still held his share portfolio.

Case 2

The contract price falls rapidly to 1460 and the clearing house as agent progressively sells out the investor's position in the market until he has lost his original assigned funds (excluding fractions). The sale of the investor's portfolio has therefore more than compensated for his loss of $70,000 in contracts and has justified his decision to sell the physical portfolio.

Case 3

The contract price gaps upwards more than 3⅓% (say 1890) as soon as the contracts are bought. The investor's contracts are closed out by the clearing house as agent at 1860 in an Exempt Closing Crossing. The investor has made a profit of $60,000 from his investment in contracts.

Case 4

The contract price gaps downwards 4% (say 1728) as soon as the contracts are bought. The contracts are closed out by the clearing house as agent at 1730 in an Exempt Closing Crossing. The investor lies lost $70,000 on his contracts but his decision to sell the physical portfolio has been justified.

TABLE

LEVERAGING = 30 X
MODE = BUY
TRAD. METH. (A)

| AAOI COMFT PRICE $ | ASSIGNED FUNDS per CONTRACT $ | PROFIT or LOSS per MOVE $ | TOTAL PROFIT or LOSS $ | REMAINING ASSIGNED FUNDS $ | NUMBER OF CTRACTS | ASSIGNED FUNDS in CTRACTS $ | SURPLUS ASSIGNED FUNDS $ | TRANSFER to/from CMT $ |
|---|---|---|---|---|---|---|---|---|
| EXAMPLE 14, CASE 1 | | | | | | | | |
| 1800 | 60 | 0 | 0 | 70000 | 1000 | 60000 | 10000 | −70000 |
| 1815 | 60.5 | 15000 | 15000 | 85000 | 1000 | 60500 | 24500 | 0 |
| 1830 | 61 | 15000 | 30000 | 100000 | 1000 | 61000 | 39000 | 0 |
| 1845 | 61.5 | 15000 | 45000 | 115000 | 1000 | 61500 | 53500 | 0 |
| 1860 | 62 | 15000 | 60000 | 130000 | 1000 | 62000 | 68000 | 0 |
| 1875 | 62.5 | 15000 | 75000 | 145000 | 1000 | 62500 | 82500 | 0 |
| 1890 | 63 | 15000 | 90000 | 160000 | 1000 | 63000 | 97000 | 0 |
| 1905 | 63.5 | 15000 | 105000 | 175000 | 1000 | 63500 | 111500 | 0 |
| 1920 | 64 | 15000 | 120000 | 190000 | 1000 | 64000 | 126000 | 0 |
| 1935 | 64.5 | 15000 | 135000 | 205000 | 1000 | 64500 | 140500 | 0 |
| 1950 | 65 | 15000 | 150000 | 220000 | 1000 | 65000 | 155000 | 0 |
| 1965 | 65.5 | 15000 | 165000 | 235000 | 1000 | 65500 | 169500 | 0 |
| 1980 | 66 | 15000 | 180000 | 250000 | 1000 | 66000 | 184000 | 0 |
| 1995 | 66.5 | 15000 | 195000 | 265000 | 1000 | 66500 | 198500 | 0 |
| 2000 | 66.666667 | 5000 | 200000 | 270000 | 1000 | 66666.667 | 203333.3 | 0 |
| EXAMPLE 14, CASE 2 | | | | | | | | |
| 1800 | 60 | 0 | 0 | 70000 | 1000 | 60000 | 10000 | −70000 |
| 1780 | 59.333333 | −20000 | −20000 | 50000 | 842 | 49958.667 | 41.333333 | |
| 1760 | 58.666667 | −16840 | −36840 | 33160 | 565 | 33146.667 | 13.333333 | |
| 1740 | 58 | −11300 | −48140 | 21860 | 376 | 21808 | 52 | |
| 1720 | 57.333333 | −7520 | −55660 | 14340 | 250 | 14333.333 | 6.6666667 | |
| 1700 | 56.666667 | −5000 | −60660 | 9340 | 164 | 9293.3333 | 46.666667 | |
| 1680 | 56 | −3280 | −63940 | 6060 | 108 | 6048 | 12 | |
| 1660 | 55.333333 | −2160 | −66100 | 3900 | 70 | 3873.3333 | 26.666667 | |
| 1640 | 54.666667 | −1400 | −67500 | 2500 | 45 | 2460 | 40 | |
| 1620 | 54 | −900 | −68400 | 1600 | 29 | 1566 | 34 | |
| 1600 | 53.333333 | −580 | −68980 | 1020 | 19 | 1013.3333 | 6.6666667 | |
| 1580 | 52.666667 | −380 | −69360 | 640 | 12 | 632 | 8 | |
| 1560 | 52 | −240 | −69600 | 400 | 7 | 364 | 36 | |
| 1540 | 51.333333 | −140 | −69740 | 260 | 5 | 256.66667 | 3.3333333 | |
| 1520 | 50.666667 | −100 | −69840 | 160 | 3 | 152 | 8 | |
| 1500 | 50 | −60 | −69900 | 100 | 2 | 100 | 0 | |
| 1480 | 49.333333 | −40 | −69940 | 60 | 1 | 49.333333 | 10.666667 | |
| 1460 | 48.666667 | −20 | −69960 | 40 | 0 | 0 | 40 | |
| EXAMPLE 14, CASE 3 | | | | | | | | |
| 1800 | 60 | 0 | 0 | 70000 | 1000 | 60000 | 10000 | −70000 |
| 1860 | 62 | 60000 | 60000 | 130000 | 0 | 0 | 130000 | |
| EXAMPLE 14, CASE 4 | | | | | | | | |
| 1800 | 60 | 0 | 0 | 70000 | 1000 | 60000 | 10000 | −70000 |
| 1730 | 57.666667 | −70000 | −70000 | 0 | 0 | 0 | 0 | |

Contracts with an Option as an Underlying Product

A contract with an underlying product of an option would trade in the same way as any other contract although even with a low leveraging ratio the clearing house may be more likely to be performing Exempt Closing Crossings because of the nature of options. If the underlying product (option) is traded in a market, the termination dates of the contract would be the same as the expiry dates of the option in the main market that the option is traded. Contract holders with an underlying product of an equity option (or an equity) would receive an adjusted contract number if bonus, reconstruction or rights issues occur. The minimum bid (tick) for contracts trading at very low prices would be reduced on a set scale.

Communications with the Clearing House Head Computer

Although anyone from any country can theoretically deal using the system, it is important to keep down the smaller investor's international telephone costs and partly provide him with high speed dedicated lines. Each investor may have a separate dedicated line (perhaps of diverse speeds) with most major corporations or institutions probably having high speed dedicated lines, to a central spot (concentrator computer) in the closest major city. Each major city in the economically developed countries (say 1,000,000 people) could have a concentrator computer that provides the market and transaction information and receives dealing instructions from the local investors. Dealing instructions from each major capital city would be automatically directed via high speed dedicated lines to a lead computer in each country that would automatically forward the dealing instruct ions via high speed dedicated lines to the clearing house head computer for execution in the country of its domicile. A number of cities in some countries may be directly linked to the clearing house head computer.

It could be considered but not be necessary if trading orders sent at the same Universal time from London, Tokyo, New York, Hong Kong, Sydney, Paris and Frankfurt to the clearing house head computer arrived on market at precisely the same time. This would provide a level playing field and may encourage more world wide participants in arbitrage.

Investor's Computer Equipment and Software

Although existing computer equipment could be used by investors many investors will prefer to be offered a complete package or part package of equipment ie. computer, printer, modem, screen, a specifically designed keyboard, compulsory software, complementing software and perhaps even specifically designed forms (such as contract notes) to be used by the printer.

Security of the System

Each investor will use Identification and Passwords to log on and use identifiable software. Some investors will also be "hard-wired" through a dedicated line. Data may be encrypted during transit. For specified accounts an investor's positions can only be opened and closed on one line using identifiable software.

Funds can only be transferred from a cash management trust account to an outside account in the same name and address as the account at the cash management trust.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of operating a contract exchange to provide a market place for the trade of contracts on which options of investors are held when it is not possible to dispose of the contracts in the market during the exercise of such options, the trade taking place between such investors comprising the steps of:

providing a cash depositing facility comprising a computer based cash management fund having depositing accounts into which said investors deposit funds, and from which said investors assign at least part of their deposited funds, known a assigned funds, for the opening of said contract position;

providing an automated real time screen trading system accessible by said investors using personal computers to trade contracts in said market place;

providing a clearing house computer electronically linked to said cash depositing facility and said automated real time trading system;

operating said clearing house computer in the contract exchange to control the operation of said market place;

requiring that each investor has sufficient assigned funds available to cover a proportion of the price of a contract, as determined by a leveraging ratio applied to that contract, before allowing that investor to open that contract position;

creating an indivisible financial package contract between a first party investor that takes a long position in the contract and a second party investor that takes a short position in the contract, both of whom, as a result of the creation of said indivisible financial package contract, become the beneficial owners of the proceeds of a binding obligation requiring a cash settlement based on a settlement price of a specific quantity of a specified type of product at an agreed price, place and time;

trading contracts between first and second party investors who choose to trade;

recording incremental contract price changes causing the first and second party investors to gain or lose the entire change in the value of the contracts held, resulting from the price changes depending on whether they hold long positions or short positions;

transferring said entire value changed from the losing one of the first and second party investors assigned funds and into the gaining one of the first and second party investors assigned funds after each said trading event;

exercising said options to dispose of some or all of a first party or counter party investor's contracts when their assigned funds become insufficient to cover said proportion of the value of the contracts held thereby after a trading event, then when the value changes such that one of the first or second party investor's assigned funds are reduced to zero, closing all that investor's contracts at that price; and also when the clearing house has also been unable to dispose of all the contracts in market, then the clearinghouse simultaneously closes all the contracts held by the other of the parties at the same price without requiring acknowledgment by either party.

2. A method according to claim 1, wherein the step of exercising option rights to dispose of one of the first or second party investor's contracts in the market, a counter one of the first or second party enters the market to dispose of contracts at a price the same as one of the market parameters, then closing all the first and second party investor's contracts and the counter party contracts that are in the market at the same time at the counter one of the first and second party's price.

3. A method according to claim 1, wherein the step of exercising option rights, if a first or second party investor has sufficient assigned funds to cover the proportion of the value of the contracts held, as determined by the leveraging ratio, at the last sale price but not at the price of one of the market parameters, and a counter one of the first and second parties enters the market at that market parameter to close a position, exercising said option rights to close sufficient of the non counter first or second party investor's contracts with the counter one of the first and second parties' contracts so that the non counter first or second investor no longer has insufficient funds to cover the proportion of the value of the contracts held at the price of that market parameter.

* * * * *